US011263409B2

(12) United States Patent
Zhang et al.

(10) Patent No.: US 11,263,409 B2
(45) Date of Patent: Mar. 1, 2022

(54) SYSTEM AND APPARATUS FOR NON-INTRUSIVE WORD AND SENTENCE LEVEL SIGN LANGUAGE TRANSLATION

(71) Applicant: Board of Trustees of Michigan State University, East Lansing, MI (US)

(72) Inventors: Mi Zhang, Okemos, MI (US); Biyi Fang, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 77 days.

(21) Appl. No.: 16/181,005

(22) Filed: Nov. 5, 2018

(65) Prior Publication Data

US 2019/0138607 A1    May 9, 2019

Related U.S. Application Data (60) Provisional application No. 62/581,181, filed on Nov. 3, 2017.

(51) Int. Cl.
| | |
|---|---|
| *G06F 40/55* | (2020.01) |
| *G06N 3/08* | (2006.01) |
| *G06N 3/04* | (2006.01) |
| *G06K 9/00* | (2006.01) |

(52) U.S. Cl.
CPC ......... *G06F 40/55* (2020.01); *G06K 9/00355* (2013.01); *G06N 3/0445* (2013.01); *G06N 3/0454* (2013.01); *G06N 3/08* (2013.01)

(58) Field of Classification Search
CPC ........ G06F 40/55; G06N 3/08; G06N 3/0445; G06N 3/0454; G06K 9/00355; G06K 9/00389

USPC ........................................................... 704/3
See application file for complete search history.

(56) References Cited

U.S. PATENT DOCUMENTS

| | | | |
|---|---|---|---|
| 10,867,597 B2* | 12/2020 | Deoras | G10L 15/1815 |
| 2010/0023314 A1* | 1/2010 | Hernandez-Rebollar | |
| | | | G10L 13/00 |
| | | | 704/3 |
| 2010/0199230 A1* | 8/2010 | Latta | G06F 3/011 |
| | | | 715/863 |

(Continued)

OTHER PUBLICATIONS

Camgoz NC, Hadfield S, Koller O, Bowden R. Subunets: End-to-end hand shape and continuous sign language recognition. In2017 IEEE International Conference on Computer Vision (ICCV) Oct. 22, 2017 (pp. 3075-3084). IEEE.*

(Continued)

*Primary Examiner* — Edwin S Leland, III
(74) *Attorney, Agent, or Firm* — Quarles & Brady LLP (57) ABSTRACT

A sign language translation system may capture infrared images of the formation of a sign language sign or sequence of signs. The captured infrared images may be used to produce skeletal joints data that includes a temporal sequence of 3D coordinates of skeletal joints of hands and forearms that produced the sign language sign(s). A hierarchical bidirectional recurrent neural network may be used to translate the skeletal joints data into a word or sentence of a spoken language. End-to-end sentence translation may be performed using a probabilistic connectionist temporal classification based approach that may not require pre-segmentation of the sequence of signs or post-processing of the translated sentence.

14 Claims, 8 Drawing Sheets
(5 of 8 Drawing Sheet(s) Filed in Color)

(56) References Cited

U.S. PATENT DOCUMENTS

| | | | |
|---|---|---|---|
| 2011/0301934 A1* | 12/2011 | Tardif | G09B 21/009 704/1 |
| 2015/0022446 A1* | 1/2015 | Asplund | G06F 3/014 345/157 |
| 2016/0091964 A1* | 3/2016 | Iyer | G02B 27/017 345/633 |
| 2017/0024380 A1* | 1/2017 | Cardoso | G06N 7/02 |
| 2017/0060254 A1* | 3/2017 | Molchanov | G06F 3/011 |
| 2018/0075659 A1* | 3/2018 | Browy | G06K 9/78 |
| 2018/0082197 A1* | 3/2018 | Aravamudan | G16B 50/10 |
| 2018/0137353 A1* | 5/2018 | Nagao | G06K 9/481 |
| 2018/0307319 A1* | 10/2018 | Karmon | G06K 9/00389 |
| 2018/0329883 A1* | 11/2018 | Leidner | G06F 40/30 |
| 2019/0138607 A1* | 5/2019 | Zhang | G06K 9/00355 |
| 2019/0286973 A1* | 9/2019 | Kovvuri | G06F 8/451 |
| 2020/0034436 A1* | 1/2020 | Chen | G06F 40/58 |
| 2020/0120110 A1* | 4/2020 | Stokes, III | G06N 3/0445 |
| 2020/0302210 A1* | 9/2020 | Santra | G01S 7/415 |
| 2020/0334452 A1* | 10/2020 | Gurbuz | G01S 7/417 |

OTHER PUBLICATIONS

Dai, Q., Hou, J., Yang, P., Li, X., Wang, F., & Zhang, X. (Oct. 2017). The sound of silence: end-to-end sign language recognition using smartwatch. In Proceedings of the 23rd Annual International Conference on Mobile Computing and Networking (pp. 462-464).*

PWRcheck DC power analyzer. http://www.westmountainradio.com/product_info.php?products_id=pwrcheck. (2016).

American Sign Language | NIDCD. https://www.nidcd.nih.gov/health/american-sign-language. (2017).

Leap Motion, https://www.leapmotion.com/. (2017).

Leap Motion API. (2017). https://developer.leapmotion.com/documentation/python/api/Leap_Classes.html.

WHO | Deafness and hearing loss. http://www.who.int/mediacentre/factsheets/fs300/en/. (2017).

Wikipedia | List of sign languages. https://en.wikipedia.org/wiki/List_of_sign_languages. (2017).

Kalpattu S Abhishek et al. Glove-based hand gesture recognition sign language translator using capacitive touch sensor. In Electron Devices and Solid-State Circuits (EDSSC), 2016 IEEE International Conference on. IEEE, 334-337.

Yannis M Assael et al. 2016. LipNet: Sentence-level Lipreading. arXiv preprint arXiv:1611.01599 (2016).

Helene Brashear et al. 2003. Using Multiple Sensors for Mobile Sign Language Recognition. In Proceedings of the 7th IEEE International Symposium onWearable Computers (ISWC '03). IEEE Computer Society, Washington, DC, USA, 45-. http://dl.acm.org/citation.cfm?id=946249.946868.

Xiujuan Chai et al. 2013. Visualcomm: A tool to support communication between deaf and hearing persons with the kinect. In Proceedings of the 15th International ACM SIGACCESS Conference on Computers and Accessibility. ACM, 76.

Xiujuan Chai et al. 2013. Sign language recognition and translation with kinect. In IEEE Conf. on AFGR.

Ching-Hua Chuan et al. 2014. American Sign Language recognition using leap motion sensor. In Machine Learning and Applications (ICMLA), 2014 13th International Conference on. IEEE, 541-544.

Fabio Dominio et al. 2014. Combining multiple depth-based descriptors for hand gesture recognition. Pattern Recognition Letters 50 (2014), 101-111.

Jeffrey Donahue et al. 2015. Long-term recurrent convolutional networks for visual recognition and description. In Proceedings of the IEEE conference on computer vision and pattern recognition. 2625-2634.

Yong Du et al. 2015. Hierarchical recurrent neural network for skeleton based action recognition. In Proceedings of the IEEE conference on computer vision and pattern recognition. 1110-1118.

Biyi Fang et al. 2016. BodyScan: Enabling Radio-based Sensing on Wearable Devices for Contactless Activity and Vital Sign Monitoring. In The 14th ACM International Conference on Mobile Systems, Applications, and Services (MobiSys). 97-110.

Fang et al. "DeepASL: Enabling Ubiquitous and Non-Intrusive Word and Sentence-Level Sign Language Translation," Proceedings of the 15th ACM Conference on Embedded Network Sensor Systems, 2017.

Alex Graves et al. 2012. Supervised sequence labelling with recurrent neural networks. vol. 385. Springer.

Alex Graves et al. 2006. Connectionist temporal classification: labelling unsegmented sequence data with recurrent neural networks. In Proceedings of the 23rd international conference on Machine learning. ACM, 369-376.

Alex Graves et al. 2013. Speech recognition with deep recurrent neural networks. In Acoustics, speech and signal processing (icassp), 2013 IEEE international conference on. IEEE, 6645-6649.

Sepp Hochreiter et al. 2001. Gradient flow in recurrent nets: the difficulty of learning long-term dependencies. (2001).

Sepp Hochreiter et al. 1997. Long short-term memory. Neural computation 9, 8 (1997), 1735-1780.

Kehkashan Kanwal et al. 2014. Assistive Glove for Pakistani Sign Language Translation. In Multi-Topic Conference (INMIC), 2014 IEEE 17th International. IEEE, 173-176.

Jonghwa Kim et al. 2008. Bi-channel sensor fusion for automatic sign language recognition. In Automatic Face & Gesture Recognition, 2008. FG'08. 8th IEEE International Conference on. IEEE, 1-6.

Vasiliki E Kosmidou et al. 2009. Sign language recognition using intrinsic-mode sample entropy on sEMG and accelerometer data. IEEE transactions on biomedical engineering 56, 12 (2009), 2879-2890.

Yun Li et al. 2010. Automatic recognition of sign language subwords based on portable accelerometer and EMG sensors. In International Conference on Multimodal Interfaces and the Workshop on Machine Learning for Multimodal Interaction. ACM, 17.

Yun Li et al. 2012. A sign-component-based framework for Chinese sign language recognition using accelerometer and sEMG data. IEEE transactions on biomedical engineering 59, 10 (2012), 2695-2704.

Scott K Liddell. 2003. Grammar, gesture, and meaning in American Sign Language. Cambridge University Press.

Giulio Marin et al. 2014. Hand gesture recognition with leap motion and kinect devices. In Image Processing (ICIP), 2014 IEEE International Conference on. IEEE, 1565-1569.

Ian McGraw et al. 2016. Personalized speech recognition on mobile devices. In Acoustics, Speech and Signal Processing (ICASSP), 2016 IEEE International Conference on. IEEE, 5955-5959.

Pedro Melgarejo et al. 2014. Leveraging directional antenna capabilities for fine-grained gesture recognition. In Proceedings of the 2014 ACM International Joint Conference on Pervasive and Ubiquitous Computing. ACM, 541-551.

Frank Mokaya et al. 2016. Burnout: a wearable system for unobtrusive skeletal muscle fatigue estimation. In Information Processing in Sensor Networks (IPSN), 2016 15th ACM/IEEE International Conference on. IEEE, 1-12.

Anh Nguyen et al. 2016. A Lightweight And Inexpensive In-ear Sensing System For Automatic Whole-night Sleep Stage Monitoring. In Proceedings of the 14th ACM Conference on Embedded Network Sensor Systems CD-ROM. ACM, 230-244.

Shahriar Nirjon et al. 2012. Musicalheart: A hearty way of listening to music. In Proceedings of the 10th ACM Conference on Embedded Network Sensor Systems. ACM, 43-56.

Nikhita Praveen et al. 2014. Sign language interpreter using a smart glove. In Advances in Electronics, Computers and Communications (ICAECC), 2014 International Conference on. IEEE, 1-5.

Abraham Savitzky et al. 1964. Smoothing and differentiation of data by simplified least squares procedures. Analytical chemistry 36, 8 (1964), 1627-1639.

Mike Schuster et al. 1997. Bidirectional recurrent neural networks. IEEE Transactions on Signal Processing 45, 11(1997), 2673-2681.

Richard Socher et al. 2011. Parsing natural scenes and natural language with recursive neural networks. In Proceedings of the 28th international conference on machine learning (ICML-11). 129-136.

(56) References Cited

OTHER PUBLICATIONS

Thad Starner et al. 1998. Real-time american sign language recognition using desk and wearable computer based video. IEEE Transactions on Pattern Analysis and Machine Intelligence 20, 12 (1998), 1371-1375.

Ilya Sutskever et al. 2014. Sequence to sequence learning with neural networks. In Advances in neural information processing systems. 3104-3112.

Noor Tubaiz et al. 2015. Glove-based continuous Arabic sign language recognition in user-dependent mode. IEEE Transactions on Human-Machine Systems 45, 4 (2015), 526-533.

Dominique Uebersax et al. 2011. Real-time sign language letter and word recognition from depth data. In Computer Vision Workshops (ICCV Workshops), 2011 IEEE International Conference on. IEEE, 383-390.

Ulrich Von Agris et al. 2008. Recent developments in visual sign language recognition. Universal Access in the Information Society 6, 4 (2008), 323-362.

YuxiWang et al. 2017. Wifall: Device-free fall detection by wireless networks. IEEE Transactions on Mobile Computing 16, 2 (2017), 581-594.

Jian Wu et al. 2015. Real-time American sign language recognition using wrist-worn motion and surface EMG sensors. In Wearable and Implantable Body Sensor Networks (BSN), 2015 IEEE 12th International Conference on. IEEE, 1-6.

Zahoor Zafrulla et al. 2010. A novel approach to american sign language (asl) phrase verification using reversed signing. In Computer Vision and Pattern Recognition Workshops (CVPRW), 2010 IEEE Computer Society Conference on. IEEE, 48-55.

Wentao Zhu et al. 2016. Co-occurrence Feature Learning for Skeleton Based Action Recognition Using Regularized Deep LSTM Networks. In Proceedings of the Thirtieth AAAI Conference on Artificial Intelligence (AAAI'16). AAAI Press, 3697-3703. http://dl.acm.org/citation.cfm?id=3016387.3016423.

* cited by examiner

SYSTEM AND APPARATUS FOR NON-INTRUSIVE WORD AND SENTENCE LEVEL SIGN LANGUAGE TRANSLATION

CROSS REFERENCE TO RELATED APPLICATIONS

This application claims priority to U.S. Provisional Application No. 62/581,181, filed Nov. 3, 2017, which is incorporated by reference in its entirety for all purposes.

STATEMENT REGARDING FEDERALLY SPONSORED RESEARCH

This invention was made with government support under 1565604 and 1617627, awarded by the National Science Foundation. The government has certain rights in the invention.

BACKGROUND

There are approximately 30 million individuals in the United States that have some appreciable degree of hearing loss that impacts their ability to hear and understand others. American Sign Language (ASL) is the primary language used by deaf people to communicate with others. Unfortunately, very few people with normal hearing understand sign language.

Traditional methods that exist for aiding a deaf person to communicate with people who do not understand sign language include utilizing a human sign language interpreter, writing on paper, or typing on an electronic device. Each of these traditional methods may have its own key limitations in terms of cost, availability and convenience. As a result, an undeniable communication barrier exists between deaf people and the hearing majority.

At the heart of tearing down this communication barrier is sign language translation technology. Conventional ASL translation systems uses sensors to capture individual ASL signs before translating those signs to English. These conventional systems use optical motion sensors, electromyography sensors, RGB cameras, and the like to capture individual ASL signs. However, these systems may generally be considered as either intrusive, with sensors having to be attached to fingers and palms of users, as lacking resolution required to capture key characteristics of some ASL signs, or as being significantly constrained by ambient lighting conditions or backgrounds in real-world settings. Additionally, conventional ASL translation systems may only be capable of translating a single sign at a time, thus requiring users to pause between adjacent signs. These limitations may significantly slow down face-to-face conversations (e.g., compared to conversations between two individuals who are not deaf or hearing impaired), potentially making conventional ASL translation systems impractical for daily-life communication scenarios.

In light of the above, there remains a need for improved systems and methods for ASL translation between deaf people and people with normal hearing.

SUMMARY

The present disclosure generally relates to sign language translation technology. More specifically, the present disclosure is directed to systems and methods that provide a complete, real-time solution for translating American Sign Language (ASL) into another written and/or spoken language, such as English. In one embodiment, these systems and methods may utilize a deep learning approach to identify individual ASL words (signs) and entire ASL sentences.

BRIEF DESCRIPTION OF THE DRAWINGS

The present invention will hereafter be described with reference to the accompanying drawings, wherein like reference numerals denote like elements.

The patent or application file contains at least one drawing executed in color. Copies of this patent or patent application publication with color drawing(s) will be provided by the Office upon request and payment of the necessary fee.

DETAILED DESCRIPTION

The present disclosure relates to systems and methods for the translation of sign language into text or speech using neural networks.

While conventional systems for translating American Sign Language (ASL) into English presently exist, these systems tend to have fundamental limitations that prevent each system from being practically useful for translating ASL in daily life scenarios. For example, many wearable translation systems require sensors to be attached to a user's fingers, palms, and forearms, which may be intrusive and impractical for daily usage. As another example, radio-frequency (RF) based systems use wireless RF signals as a sensing mechanism to capture hand movements. However, these RF based systems tend to lack the resolution required to capture hand shape, which is generally important for accurately translating ASL. As another example, RGB camera systems (e.g., that capture only visible light images) may be capable of capturing information about hand shape and hand movement, but tend to fail to reliably capture such information in poor lighting conditions or generally uncontrolled backgrounds in real-world scenarios. Moreover, the videos/images captured by RGB camera systems may be considered invasive to the privacy of the user and surrounding bystanders.

In contrast, embodiments of the present system and methods for ASL translation may use infrared imaging to capture and track skeletal joint data (e.g., corresponding to skeleton joints of an individual's fingers, hands, wrists, and forearms) that is associated with the formation of an ASL sign and translate the ASL sign in a way that is non-invasive, that has sufficient resolution to capture hand shape, movement and location, that is operable in low light conditions and uncontrolled background conditions, and that generally preserves the privacy of the user and bystanders by only storing skeletal joint data rather than storing image or video data for an entire scene.

Embodiments of the present system and methods for ASL translation may translate captured skeletal joint data into an English word or, in some cases, English sentences using a neural network based system architecture. Neural networks are computing systems that progressively learn to perform tasks through example-based training. A neural network is based on a collection of connected units referred to as neurons or nodes. Each connection between two neurons can transmit a signal from one of the two neurons to the other. The receiving neuron can process the signal (or in cases in which the receiving neuron receives multiple connections, multiple signals) before providing the result of this processing as an output (e.g., to downstream neurons to which it is connected. Connections between neurons may be assigned respective weights, which may be altered during training of the neural network. For example, a given connection between two neurons may be assigned a weight (e.g., a value between 0 and 1) by which a signal passed between the two neurons via the connection is multiplied. This weight may be dynamically altered during training, but may be static (e.g., unchanging) when the neural network is implemented upon the completion of training. In some instances, activation functions may be applied during the processing performed by each node. These activation functions may, for example, be time dependent. A specific type of neural network, known as a hierarchical bidirectional recurrent neural network (HB-RNN), may be used in embodiments of the present disclosure to perform ASL translation.

Figure 1:
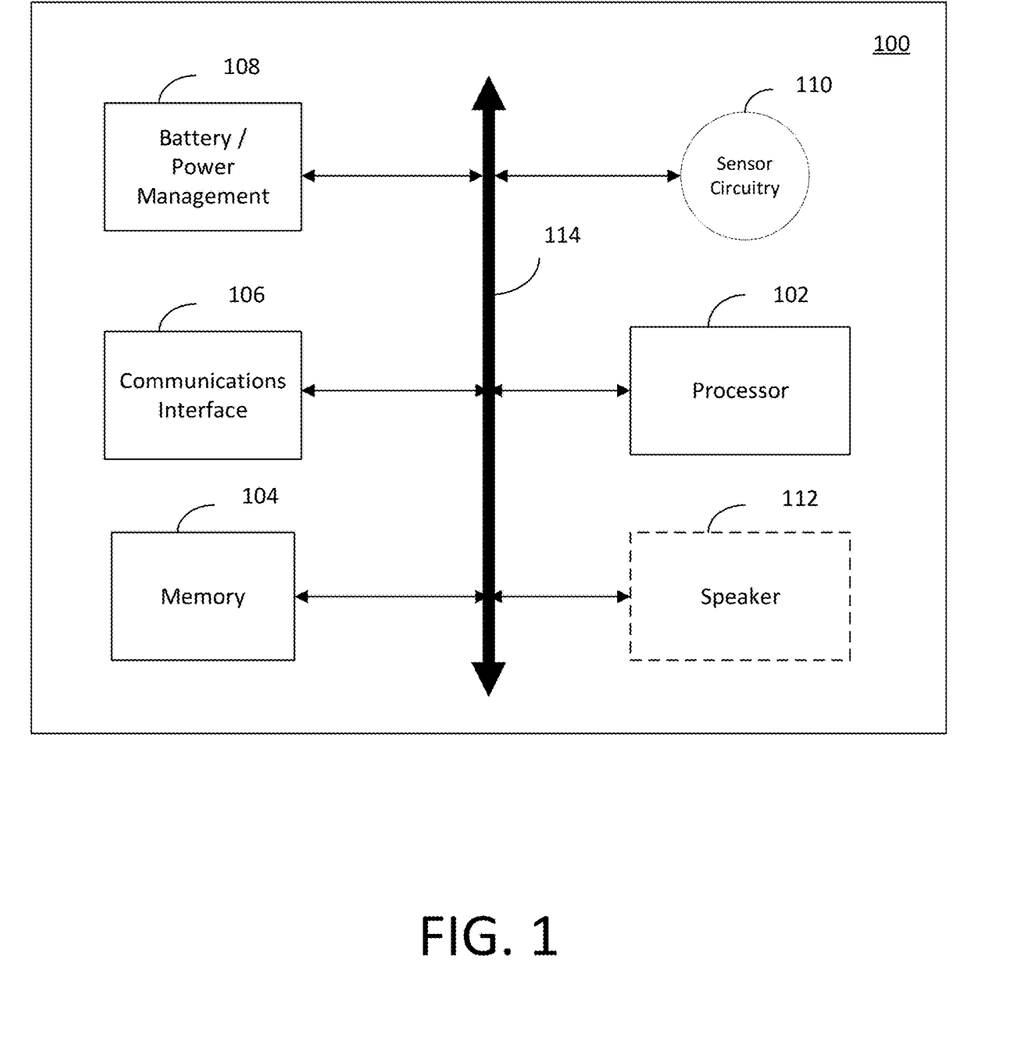
FIG. 1 is an illustrative block diagram showing a sign language translation system, in accordance with aspects of the present disclosure.

Turning now to FIG. 1, a block diagram of an example system 100 (e.g., a sign language translation system), is shown. As an illustrative, non-limiting example, system 100 could be a wearable device (e.g., a necklace, pendant, wristband, virtual reality or augmented reality headset, clip-on attachment, etc.) or may be implemented by a desktop or laptop computer. In still other embodiments, system 100 may be a tablet device, a mobile phone device, or any other applicable portable electronic device.

System 100 includes a processor 102, a memory 104, a communications interface 106, an optional battery and power management module 108, sensor circuitry 110, and, optionally, a speaker 112. Some or all of these components may communicate over a bus 114. Although bus 114 is illustrated here as a single bus, it may instead be implemented as one or more busses, bridges, or other communication paths used to interconnect components of system 100. Memory 104 may be a non-transitory computer readable storage medium (e.g., read-only memory (ROM), random access memory (RAM), flash memory, etc.). Optional battery and power management module 108 may provide power to components of system 100 in a controlled manner, and may be optionally omitted in embodiments where system 100 is connected to a desktop or laptop computer (e.g., as a peripheral device). Optional speaker 112 may reproduce audible sound (e.g., via a diaphragm) when driven by electrical signals (e.g., provided by processor 102 over bus 114). Sensor circuitry 110 may include infrared light sensors (e.g., infrared image sensors), which may capture images (e.g., infrared images) of a user's hands as they form ASL signs (sometimes referred herein to as signing) in its field of view. By using infrared light sensors (e.g., rather than conventional RGB cameras), images of hands and forearms forming ASL signs can be captured and tracked in poor light conditions, or even in dark conditions (e.g., conditions with little to no visible light, but in which infrared light may still be present).

Sensor circuitry 110 may further include a controller that generates skeletal joints data from the captured images. The skeletal joints data may include, for example, a temporal sequence of 3D coordinates of the skeleton joints of fingers, palms, and forearms captured (e.g., through infrared imaging) during signing, and is described in greater detail below in connection with FIGS. 3 and 4. Processor 102 may execute instructions stored in memory 104 to translate the skeletal joints data into speech or text. This translation may, for example, be performed using a hierarchical bidirectional recurrent neural network (HB-RNN), and is described in greater detail below in connection with FIGS. 5-8.

ASL is a complete and complex language that mainly employs signs made by moving the hands. Each individual sign is characterized by three key sources of information: hand shape, hand movement, and relative location of two hands. It is the combination of these three characteristics that encodes the meaning of each sign.

Figure 2:
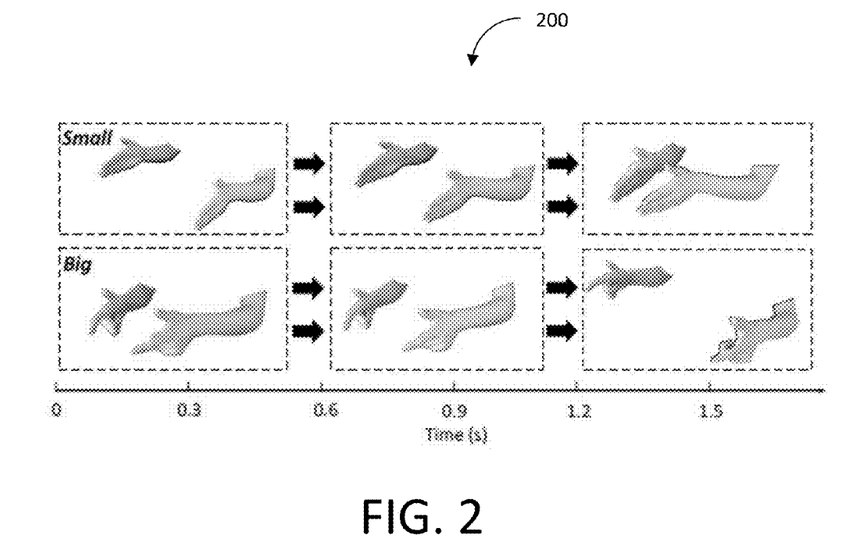
FIG. 2 is an illustrative graph showing two hands forming two different American Sign Language (ASL) signs over time, in accordance with aspects of the present disclosure.

Turning now to FIG. 2, a graph illustrating the signing of the ASL signs for "small" and "big" over time is shown. Graph 200 shows three distinct phases in the formation of the ASL sign for "small" and three distinct phases in the formation of the ASL sign for "big" over the course of 1.8 seconds. It should be noted that the timeline shown here is intended to be illustrative and not limiting. The signing of "small" or "big" could take more or less time to perform depending upon the individual forming the signs.

Specifically, to sign "small," a practitioner of ASL starts with holding both hands in front of them with fingers closed (hand shape), and then moves their hands towards one another (hand movement and relative location of two hands). In comparison, to sign "big," a practitioner starts with holding both hands in front of them and extending the thumb and index finger of each hand to form a slightly bent 'L' shape (hand shape), and then moves their hands away from one another (hand movement and relative location of two hands). It should be noted that many ASL signs involve subtle differences in the three key characteristics mentioned above, beyond those shown in the present example.

Figure 3:
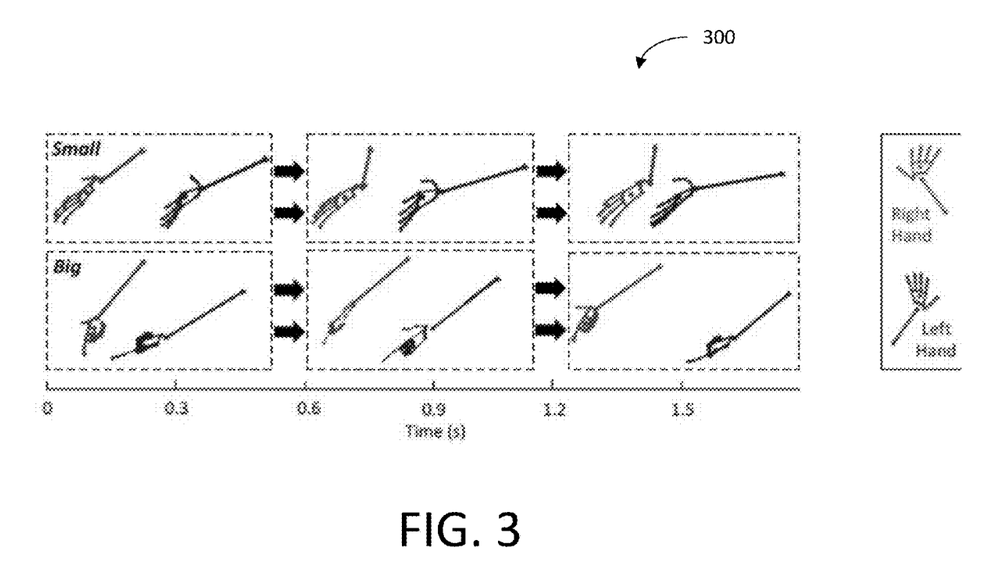
FIG. 3 is an illustrative graph showing skeleton joint representations of two hands forming two different ASL signs over time, in accordance with aspects of the present disclosure.

FIG. 3 shows a graph that includes a skeletal joints representation of the ASL signs shown in graph 200 of FIG. 2. Graph 300 shows the three distinct phases in the formation of the ASL sign for "small" and the three distinct phases in the formation of the ASL sign for "big" over the course of 1.8 seconds, only from the perspective of skeletal joints data, rather than from the perspective of an actual person's hands and forearms. The skeletal joints representation shown here is derived from skeletal joints data that may include, for example, a temporal sequence of 3D coordinates of the skeleton joints of fingers, palms, and forearms. This skeletal joints data may be generated by tracking the movement of a person's hands and forearms with an image sensor(s) in a system (e.g., infrared image sensor(s) in sensor circuitry 110 in system 100 of FIG. 1). In some embodiments, the system may only store this skeletal joints data in memory (e.g., memory 104 of FIG. 1) rather than storing entire images captured by the image sensor(s) in order to preserve the privacy of individuals whose images are detected by the system, and to provide enough resolution to precisely detect hand shape as well as hand movements and locations.

Figure 4:
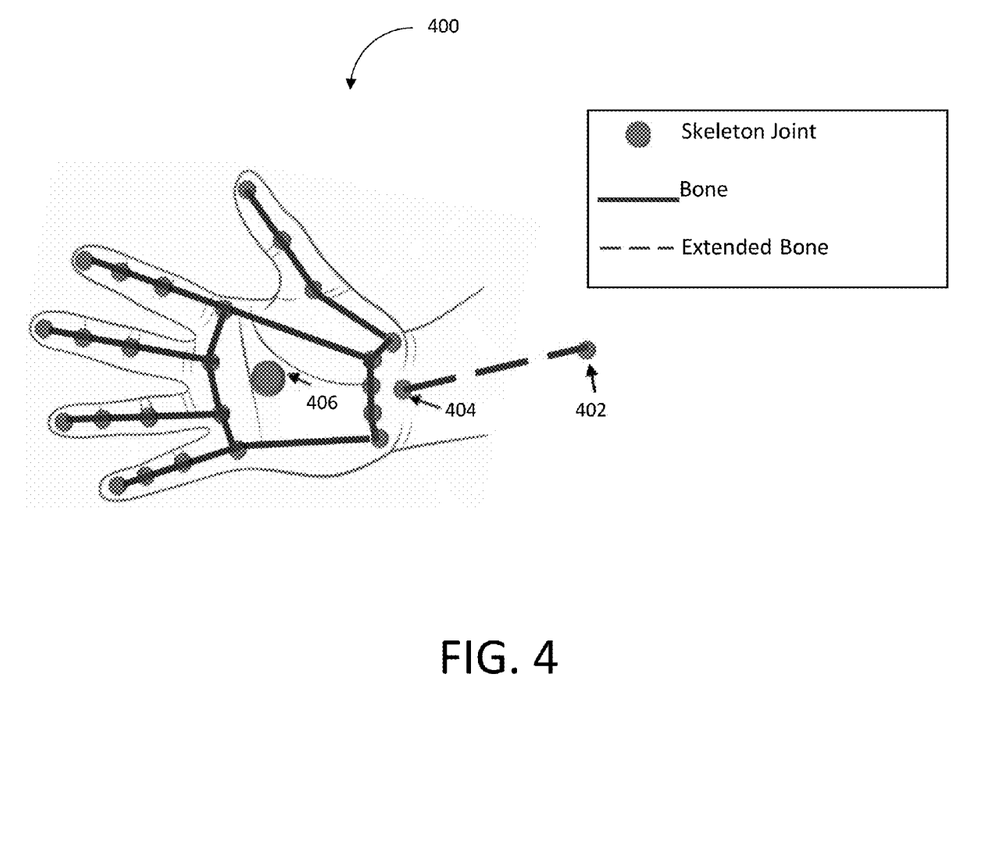
FIG. 4 is an illustrative diagram showing a relationship between a skeleton joint representation and a corresponding hand, in accordance with the present disclosure.

Turning now to FIG. 4, a diagram illustrating mapping between skeleton joints, bones, and extended bones represented in skeleton joint data (e.g., the skeleton joint data produced by sensor circuitry 110 of FIG. 1) and a human hand is shown. As shown in diagram 400, skeleton joints are represented as circles and include elbow joint 402, wrist joint 404, palm-center 406, and various other finger, thumb, and wrist joints, bones are represented by solid lines and connect skeleton joints, and extended bones (e.g., representing the bone between elbow joint 402 and wrist joint 404) are represented by dotted lines.

Figure 5:
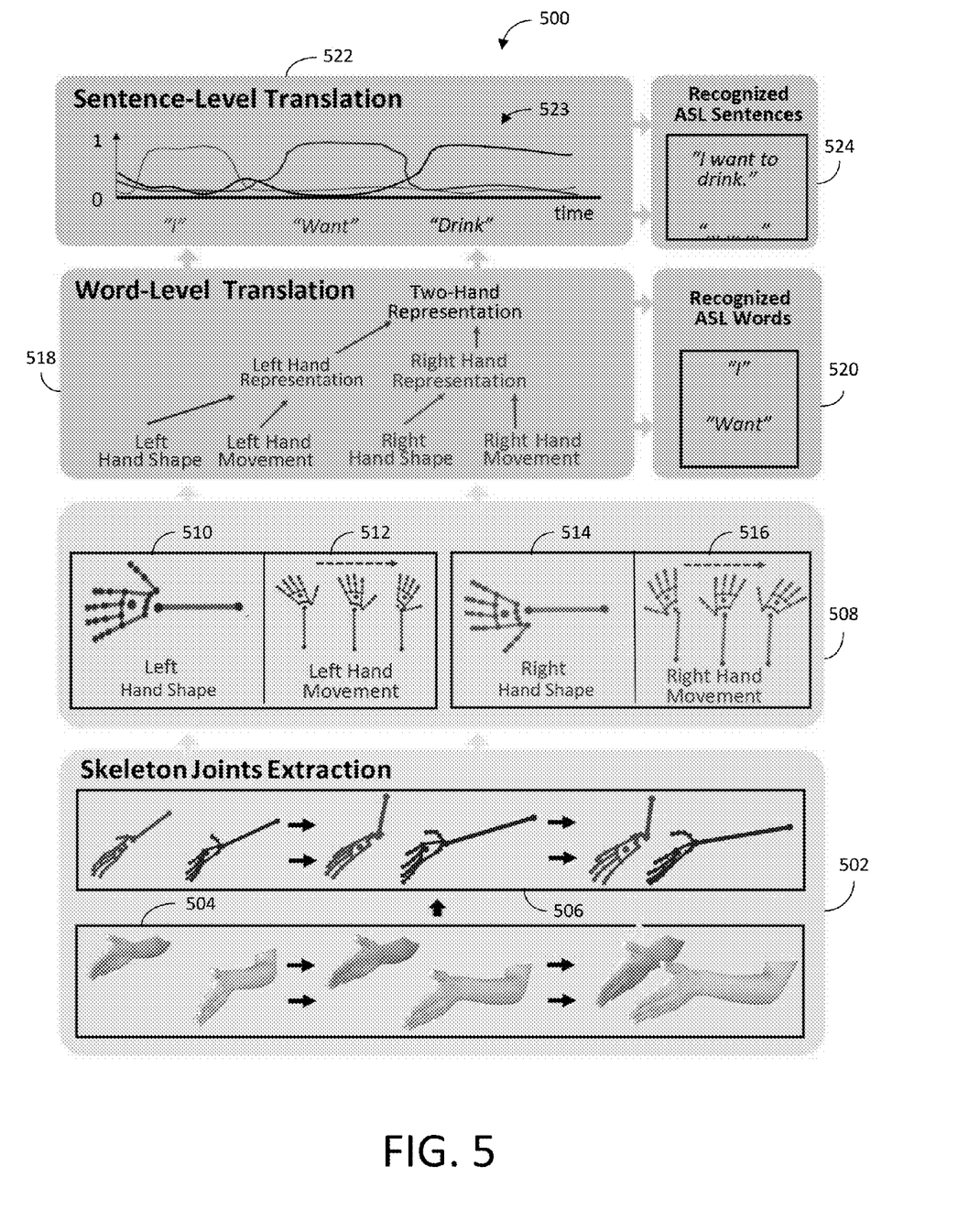
FIG. 5 is an illustrative flow chart showing a system architecture by which ASL signs may be translated into another spoken or written language, in accordance with the present disclosure.

Turning now to FIG. 5, an illustrative flow chart showing a system architecture 500 by which ASL signs may be translated into another spoken or written language (e.g., English) is shown. The system architecture 500 may, in the present example, be implemented by executing corresponding instructions (e.g., instructions stored in the memory 104 of the system 100, FIG. 1) with a processor (e.g., the processor 102 of the system 100, FIG. 1).

At step 502, skeletal joints data 506 may be extracted from images 504 (e.g., infrared images) captured by an image sensor(s) in sensor circuitry 110 of the system 100. For example, system 100 may begin collecting images 504 for skeletal joints data extraction and subsequent translation in response to a user powering on system 100 or turning on a translation function of system 100 (e.g., by pressing a button or sliding a switch). Alternatively, system 100 may continuously capture images while turned on, and may initiate full ASL translation functionality in response to detecting (e.g., by periodically monitoring the captured images) that a predefined ASL sign or phrase has been formed in front of sensor circuitry 110 of system 100. In this way, power may be conserved when translation is not needed, and the unintended translation of incidental hand movements of a user may be avoided.

The skeletal joints data 506 produced by the sensor circuitry 110 may be noisy in its raw form. A filter, such as a Savitzky-Golay filter may be applied to the raw skeletal joints data 506 in order to improve the signal-to-noise ratio (SNR) of this data. For example, let $$J_{i,j,t}=(x_{i,j,t},y_{i,j,t},z_{i,j,t}),\ i=\{\text{left,right}\},\ j=\{1,\ldots,N\},\ t=\{1,\ldots,T\}$$

denote the t-th frame of the temporal sequence of the 3D coordinates of the skeleton joints of fingers, palms, and forearms a single ASL sign, where x, y, z, denote the 3D coordinates of the skeleton joints, i is the hand index indicating whether a given data point pertains to the right hand or the left hand, j is the skeleton joint index representing each of the skeleton joints being tracked by the system 100 (e.g., the skeleton joints shown in diagram 400), t is the frame index, N denotes the total number of skeleton joints being tracked in one hand, and T, denotes the total number of frames included in the temporal sequence. A Savitsky-Golay filter that may be used to smooth the skeleton joints data 506 may be represented as:

$$\tilde{J}_{i,j,t}=(-3J_{i,j,t-2}+12J_{i,j,t-1}+17J_{i,j,t}+12J_{i,j,t+1}-3J_{i,j,t+2})/35$$

where $\tilde{J}_{i,j,t}$ denotes the smoothed 3D coordinates of the skeletal joints data 506 in the t-th frame.

At step 508, based on the smoothed temporal sequence of the skeletal joints data 506, key characteristics of ASL signs may be extracted, including hand shape 510, 514, hand movement, 512, 516 and relative location of two hands from each time frame of the sequence $\tilde{J}_{i,j,t}$. Since hand shape is independent of the absolute spatial location of the hand and is characterized by the relative distances among skeletal joints of the palm and the fingers, the hand shape information for both left and right hands may be extracted by zero-centering the palm-center (e.g., palm-center 406 of FIG. 4) of the right hand and then normalizing the 3D coordinates of the skeleton joints to it as $$S_{i,j,t}=\tilde{J}_{i,j,t}-\tilde{J}_{i,j=right\_palm\_center,t}$$

where right_palm_center denotes the skeletal joint index for the palm-center of the right hand, and where $S_{i,j,t}$ denotes the extracted hand shape information 510, 514 for both the right and left hands. By performing this zero-centering based on the palm-center of the right hand, the relative location of the left hand to the right hand is also encoded in $S_{i,j,t}$. It should be noted that this zero-centering may alternatively be performed based on the palm-center of the left hand, with similar results. Lastly, hand movement information 512, 516 of both left and right hands is extracted as the spatial displacement of each skeleton joint between two consecutive frames, denoted as:

$$M_{i,j,t}=\begin{cases}(0,0,0), & \text{if } t=1 \\ \tilde{J}_{i,j,t}-\tilde{J}_{i,j,t-1} & \text{if } t=2,\ldots,T.\end{cases}$$

Taken together, the ASL characteristics extracted from each frame of the temporal sequence of 3D coordinates of the skeleton joints data 506 result in four spatio-temporal ASL characteristics trajectories that capture information related to left hand shape 510 (which also encodes the relative location of the left hand to the right hand), left hand movement 512, right hand shape 514, and right hand movement 516, which are herein respectively denoted as $S_{left}$, $M_{left}$, $S_{right}$, and $M_{right}$.

At step 518, word-level ASL translation may be performed using the four spatio-temporal ASL characteristics trajectories determined that were determined in step 508. As will be described in more detail below in connection with FIGS. 6-8, left hand shape 510, left hand movement 512, right hand shape 514, and right hand movement 516 may be used to generate a two-hand representation of an ASL word/sign. As will be described, a trained neural network (e.g., a hierarchical bidirectional recurrent neural network) may be used to transform the spatio-temporal ASL characteristics trajectories into the two-handed representation of the ASL word/sign, and may further translate the two-handed representation of the ASL word/sign into a corresponding word of another spoken/written language such as English. In some embodiments, translation may take place on a word-by-word basis to produce individually translated/recognized ASL words 520.

In other embodiments, the system architecture 500 may be designed to, at step 522, perform sentence level translation, which builds upon the word-level translation of step 518, translating a series ASL signs/words into one or more recognized sentences 524 (e.g., English sentences), rather than translating an individual ASL sign/word. For example, a connectionist temporal classification (CTC) based framework may be used to leverage the captured probabilistic dependencies between ASL words in one complete sentence and may translate the whole sentence end-to-end without requiring users to pause between adjacent signs. An example of this CTC-based sentence-level ASL translation is depicted in graph 523, in which the CTC identification of the ASL sentence "I want drink" is performed. The sentence-level translation of step 522 may not require pre-segmentation of individual words or post-processing, which may contribute to the end-to-end nature of the sentence-level translation that may be performed by system architecture 500. A more detailed description of how system architecture 500 may translate full end-to-end ASL sentences is provided in connection with FIG. 8 below.

Figure 9:
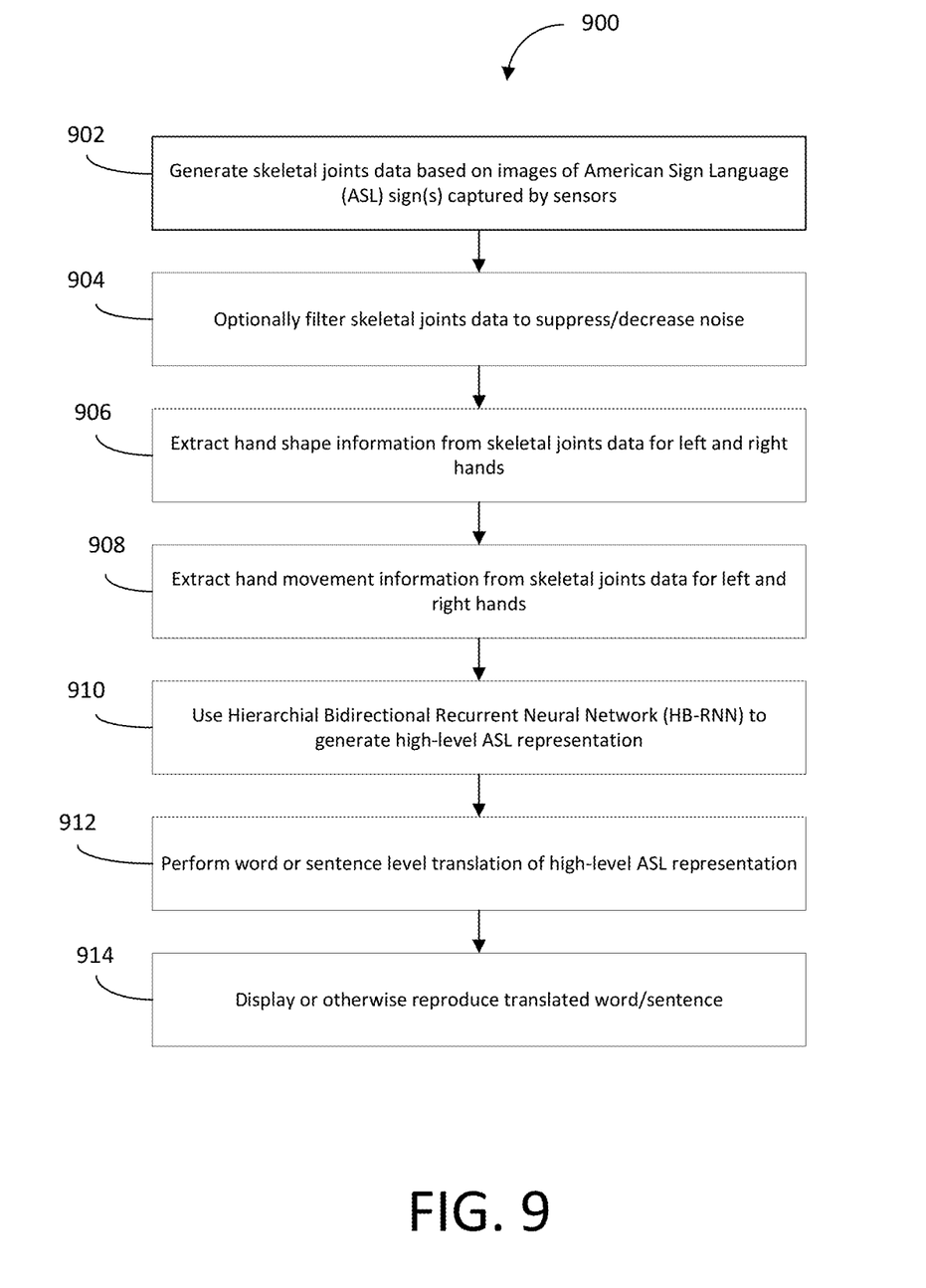
FIG. 9 is an illustrative process flow chart illustrating a process by which skeletal joints data representing the formation of an ASL sign or a sequence of ASL signs is translated into a predicted word or sentence, in accordance with aspects of the present disclosure.

FIG. 9 shows the process flow of a method 900, which may be implemented in conjunction with system architecture 500 of FIG. 5 to perform ASL translation.

At step 902, skeletal joints data is generated based on images of ASL sign formation captured by sensors.

At step 904, skeletal joints data is optionally filtered to suppress or decrease noise.

At step 906, hand shape information is extracted from the skeletal joints data for both the left and right hands used to form the ASL sign(s).

At step 908, hand movement information is extracted from the skeletal joints data for both the left and right hands used to form the ASL sign(s).

At step 910, an HB-RNN is used to generate a high-level ASL representation of the ASL sign(s) from the extracted hand shape information and hand movement information.

At step 912, word- or sentence-level translation is performed on the high-level ASL representation. For sentence-level translation, a CTC approach may be used.

At step 914, the result of the word- or sentence-level translation is displayed or otherwise reproduced.

Figure 6:
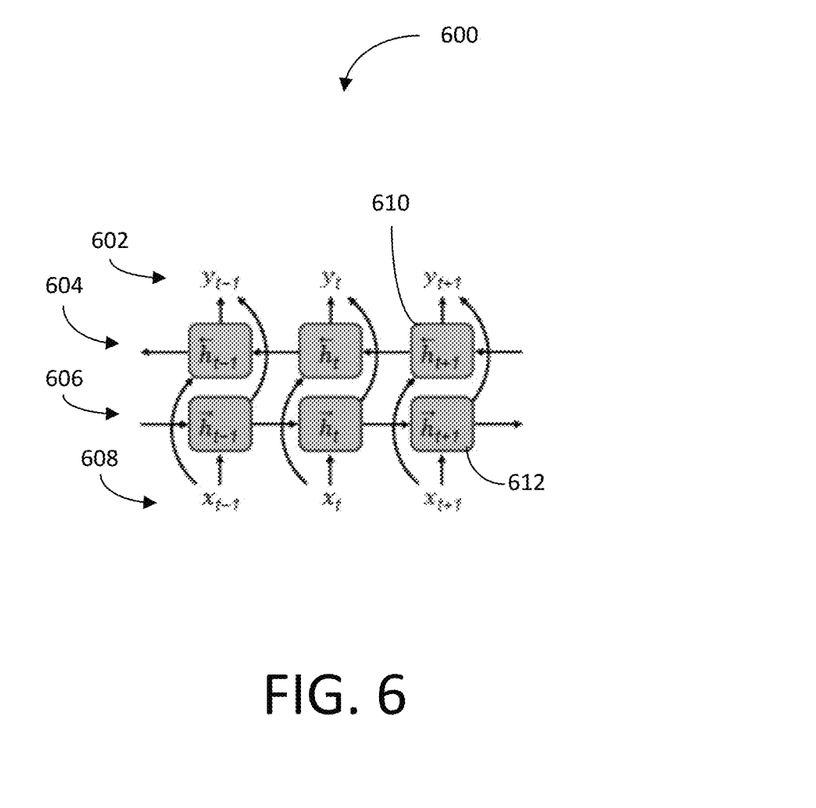
FIG. 6 is an illustrative block diagram showing a network architecture of a bi-directional recurrent neural network (B-RNN), in accordance with the present disclosure.

Turning now to FIG. 6, a network architecture of a bidirectional recurrent neural network (B-RNN) and Long Short-Term Memory (LSTM) (e.g., that may be used in the HB-RNN described in connection with FIGS. 5, 7, and 8).

A recurrent neural network (RNN) is a network architecture that may be used for the modeling of sequential data. Given an input temporal sequence $x=(x_1, x_2, \ldots, x_T)$, where in our case $x_t$ is the t-th frame of the spatio-temporal ASL characteristics trajectories containing T frames, the hidden states of a recurrent layer $h=(h_1, h_2, \ldots, h_T)$, and the output $y=(y_1, y_2, \ldots, y_T)$, of a RNN can be obtained as:

$$h_t = \theta_h(W_{xh}x_t + W_{xx}h_{t-1} + b_h)$$

$$y_t = \theta_y(W_{ho}h_t + b_o)$$

where $W_{xh}$, $W_{xx}h_{t-1}$, and $W_{ho}$ are connection weight matrices, $b_h$ and $b_o$ are bias values, and $\theta_h$ and $\theta_y$ are activation functions.

The RNN model described above only contains a single recurrent hidden layer and is unidirectional. Unidirectional RNNs such as this one may be limited in that they can only look backward and thus can only access past information at each time point in the temporal sequence for inference. In the context of sign language translation, this limitation could cause translation errors when different signs share very similar characteristics at the beginning of forming the signs. In order to address this limitation, bidirectional RNNs (B-RNNs) may be used.

As shown, a B-RNN 600 has two separate recurrent hidden layers, one pointing backward (i.e., backward layer 604) and the other pointing forward (i.e., forward layer 606), where an input temporal sequence 608 is provided to both the backward layer 604 and the forward layer 606, and where backward layer 604 and forward layer 606 produce an output temporal sequence 602. Backward layer 604 includes backward nodes 610 that receive future information from adjacent backward nodes and that provide information to other adjacent backward nodes. Forward layer 606 includes forward nodes 612 that receive past information from adjacent forward nodes and that provide information to other adjacent forward nodes. As such, B-RNN 600 may look both backward and forward and can thus utilize both past and future information at a given time point (e.g., $x_t$) in the temporal sequence (e.g., x) to infer the ASL sign being performed.

The recurrent structure of the B-RNN 600 allows it to learn complex temporal dynamics in the temporal space. However it can be difficult to train a B-RNN, or a unidirectional RNN to learn long-term dynamics due to the vanishing and exploding gradients problem. The vanishing gradient problem refers to a phenomenon observed in some neural networks in which neurons in earlier layers of a given neural network learn more slowly than the neurons in later layers of the given neural network. The exploding gradient problem refers to another phenomenon observed in some neural networks in which earlier layers of a given neural network learn more quickly than neurons in later layers of the given neural network. In order to help overcome the vanishing and exploding gradient problems, a LSTM architecture may be implemented along with B-RNN 600, which enables B-RNN 600 to learn when to forget previous hidden states and when to update hidden states given new input, which may allow for the efficient capture of long-term dynamics.

Figure 7:
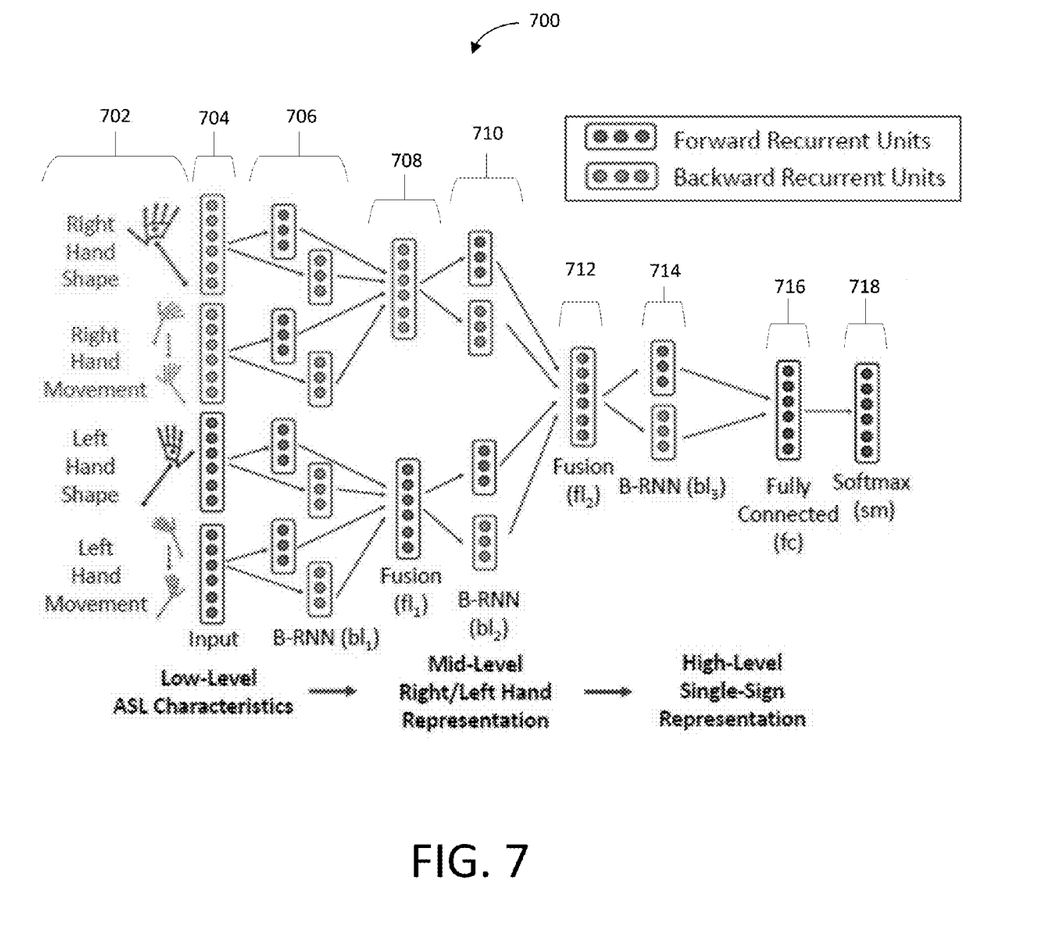
FIG. 7 is an illustrative diagram showing a network architecture of a hierarchical bidirectional recurrent neural network (HB-RNN) for word-level ASL translation, in accordance with the present disclosure.

Turning now to FIG. 7, a network architecture of a HB-RNN 700 is shown. Depending on how HB-RNN 700 is designed, it may be used for either individual word-level translation of ASL signs (e.g., in connection with step 518 of FIG. 5) or sentence-level translation of ASL signs (e.g., in connection with step 522 of FIG. 5). As shown, HB-RNN 700 includes an input layer 704, a first B-RNN layer 706, a first fusion layer 708, a second B-RNN layer 710, a second fusion layer 712, a third B-RNN layer 714, a fully connected layer 716, and a softmax layer 718. The HB-RNN 700 may, for example, be implemented using a hardware processor (e.g., processor 102, FIG. 1) that executes instructions (e.g., instructions stored in memory 104, FIG. 1) for implementing HB-RNN 700. A method by which HB-RNN 700 may be used to translate spatio-temporal ASL characteristics trajectories (sometimes referred to simply as ASL characteristics) into a spoken language word or sentence will now be described in connection with FIG. 8.

Figure 8:
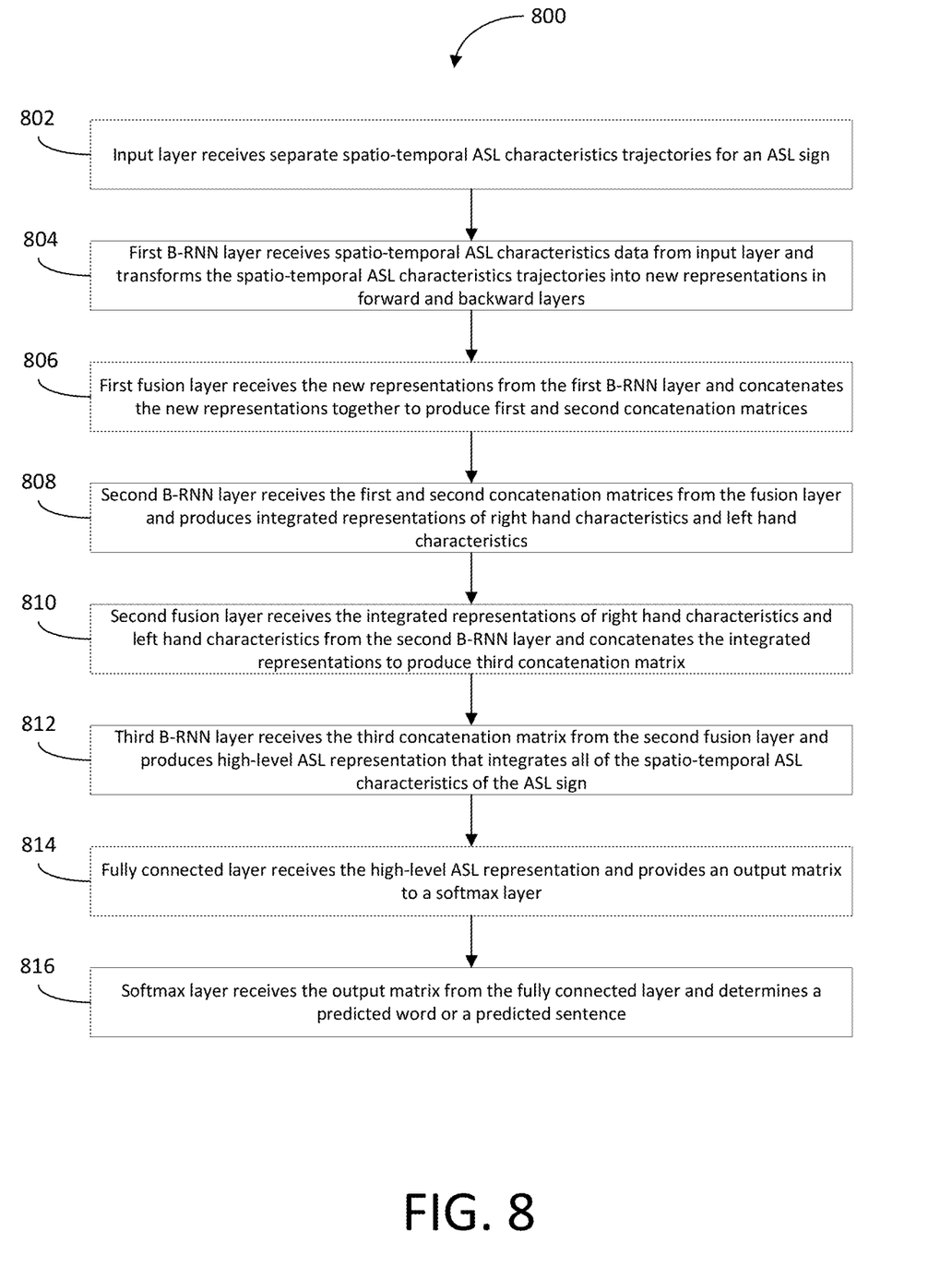
FIG. 8 is an illustrative process flow chart illustrating a process by which spatio-temporal ASL characteristics data for an ASL sign or a sequence of ASL signs is translated into a predicted word or sentence using a HB-RNN, in accordance with aspects of the present disclosure.

FIG. 8 shows a process flow chart that illustrates a method 800 for translating an ASL sign or a sequence of ASL signs into a word or sentence of another language. It should be noted that some or all steps of method 800 may be performed by a hardware processor (e.g., processor 102, FIG. 1) executing instructions (e.g., instructions stored in memory 104, FIG. 1) for performing method 800. Method 800 will be described in the context of the elements of HB-RNN 700 of FIG. 7. However, it should be noted that method 800 is not intended to be limited for use with only a HB-RNN neural network architecture that uses both hand shape information and hand movement information for ASL translation. In some embodiments, method 800 could instead be used with other neural network architectures, including hierarchical unidirectional RNN (H-RNN), simple bidirectional RNN (SB-RNN) without hierarchical structure, a hierarchical bidirectional RNN that uses only hand shape information (HB-RNN-S), and a hierarchical bidirectional RNN that uses only hand movement information (HB-RNN-M).

At step 802, input layer 704 receives the four spatio-temporal ASL characteristics trajectories 702 that capture information related to the left hand shape ($S_{left}$), left hand movement ($M_{left}$), right hand shape ($S_{right}$), and right hand movement ($M_{right}$) (e.g., associated with the formation of an ASL sign or a sequence of ASL signs) to the four separate B-RNNs of the first B-RNN layer 706. While these spatio-temporal ASL characteristics trajectories may define a given ASL sign, these characteristics may be isolated and at a low level and therefore may be unsuitable for direct word-level or sentence-level ASL translation. It therefore may be desirable to use a hierarchical model based on bi-directional recurrent neural networks, such as HB-RNN 700, to integrate the isolated low-level spatio-temporal ASL characteristics trajectories into an organized high-level representation that can be used for word-level ASL translation.

At step 804, input layer 704 feeds the spatio-temporal ASL characteristics trajectories 702 into the four separate B-RNNs of the first B-RNN layer 706 (denoted here as $bl_1$). The forward layers $\vec{h}_{bl_1}$ and backward layers $\overleftarrow{h}_{bl_1}$ of the first B-RNN layer 706 transform the low level spatio-temporal ASL characteristics trajectories 702 into new representations of the right hand shape $\{\vec{h}_{bl_1}^{\,t}(S_{right}^t);$ $\overleftarrow{h}_{bl_1}^{\,t}(S_{right}^t)\}$, right hand movement $\{\vec{h}_{bl_1}^{\,t}(M_{right}^t);$ $\overleftarrow{h}_{bl_1}^{\,t}(M_{right}^t)\}$, left hand shape $\{\vec{h}_{bl_1}^{\,t}(S_{left}^t);$ $\overleftarrow{h}_{bl_1}^{\,t}(S_{left}^t)\}$, and left hand movement $\{\vec{h}_{bl_1}^{\,t}(M_{left}^t);$ $\overleftarrow{h}_{bl_1}^{\,t}(M_{left}^t)\}$.

At step 806, the new representations of right hand shape, right hand movement, left hand shape, and left hand movement are fed into the first fusion layer 708 from the first B-RNN layer 706. The first fusion layer 708 concatenates the new representation of right hand shape with the new representation of right hand movement and the new representation of left hand shape with the new representation of left hand movement to produce first and second concatenation matrices denoted as:

$$R_{fl_1}^{i,t}=\{\vec{h}_{bl_1}^{\,t}(S_i^t),\overleftarrow{h}_{bl_1}^{\,t}(S_i^t),\vec{h}_{bl_1}^{\,t}(M_i^t);\overleftarrow{h}_{bl_1}^{\,t}(M_i^t)\},\,i=\{right,left\}$$

At step 808, the first and second concatenation matrices are separately fed into the two B-RNNs of the second B-RNN layer 710 from the fursion layer 708. The forward layers $\vec{h}_{bl_2}$ and backward layers $\overleftarrow{h}_{bl_2}$ of the second B-RNN layer 710 produce an integrated representation of right hand characterisitcs, denoted as $\vec{h}_{bl_2}^{\,t}(R_{fl_1}^{right,t});$ $\overleftarrow{h}_{bl_2}^{\,t}(R_{fl_1}^{right,t})$, and an integrated representation of left hand characteristics, denoted as $\vec{h}_{bl_2}^{\,t}(R_{fl_1}^{left,t});$ $\overleftarrow{h}_{bl_2}^{\,t}(R_{fl_1}^{left,t})$.

At step 810, the integrated representations of the right hand characteristics and the left hand characteristics are fed into the second fusion layer 712 from the second B-RNN layer 710. Fusion layer 712 concatenates the integrated representations to form a third concatenation matrix denoted as:

$$R_{fl_2}^t=\{\vec{h}_{bl_2}^{\,t}(R_{fl_1}^{right,t}),\overleftarrow{h}_{bl_2}^{\,t}(R_{fl_1}^{right,t}),\overleftarrow{h}_{bl_2}^{\,t}(R_{fl_1}^{right,t})\}$$
$$(R_{fl_1}^{left,t});\overleftarrow{h}_{bl_2}^{\,t}(R_{fl_1}^{left,t})\}$$

At step 812, the third concatenation matrix is fed into a single B-RNN of the third B-RNN layer 714 from the second fusion layer 712. The forward layer $\vec{h}_{bl_3}$ and backward layer $\overleftarrow{h}_{bl_3}$ of the third B-RNN layer 714 produce a high level ASL representation, denote as $\vec{h}_{bl_3}^{\,t}(R_{fl_2}^t);$ $\overleftarrow{h}_{bl_3}^{\,t}(R_{fl_2}^t)$.

At step 814, the high level ASL representation is fed into the fully connected layer 716. Fully connected layer 716 concatenates the forward layer and backward layer components to produce an output matrix denoted as:

$$O_{fc}^t=\{\vec{h}_{bl_3}^{\,t}(R_{fl_2}^t),\overleftarrow{h}_{bl_3}^{\,t}(R_{fl_2}^t)\}$$

At step 816, the output matrix $O_{fc}^t$ produced by the fully connected layer 716 is fed into the softmax layer 718. The softmax layer 718 sums up all of the output matrices produced by the fully connected layer 716 across the temporal sequence (e.g., for times $t_1$-$t_T$) to produce a cumulative output matrix, denoted as:

$$O=\sum_{t=1}^{T}O_{fc}^t$$

The cumulative output matrix O is then normalized by the following softmax function in the softmax layer 718 to calculate the predicted word class probability, given a sequence of skeletal joints data, J:

$$P(C_k|J)=\frac{e^{O_k}}{\sum_{n=1}^{C}e^{O_n}},k=1,\ldots,C$$

where C denotes the total number of ASL words in a trained ASL dictionary (e.g., that is stored in the memory 104 of the system 100 of FIG. 1). The softmax layer 718 produces the probability matrix p(C/J) at its output, from which the word with the greatest probability is selected as the result of the overall translation of the ASL sign. By accumulating results and normalizing across all the frames of an ASL signing sequence, method 800 is able to make inference based on the information of the entire sequence. Additionally, this allows method 800 to handle ASL signs having different sequence lengths as well as sequence length variation caused by variations in signing speed. It should be noted that, in some embodiments, a probability threshold may be defined (e.g., 40%) and stored in memory (e.g., stored in the memory 104 of the system 100 of FIG. 1). If the word with the greatest probability in the probability matrix does not have a probability exceeding the probability threshold, the result of the translation of the ASL sign may be selected as "unknown" and/or an error message may be displayed, which may, for example, indicate that the forming of the ASL sign was unclear or otherwise unable to be translated.

While the above description of step 816 focuses on word-level translation of ASL sentences, in some embodiments, HB-RNN 700 and method 800 may instead perform sentence-level ASL translation using a probabilistic approach based on CTC at step 816. For example, softmax layer 718 may be modified to implement CTC when performing sentence-level ASL translation at step 816. This modification may be realized through training HB-RNN 700 (e.g., and the ASL dictionary used by HB-RNN 700) using entire sentences, rather than single words. Based on the modified softmax layer 718, the probabilities of all the possible sentences formed by the words included in the trained ASL dictionary can be computed.

Connectionist Temporal Classification, also known as CTC, is a sequence-to-sequence learning technique. Generally, CTC takes in the probability distributions of all possible labels at each time step, and then computes the probability of a sequence of labels given the probability distributions. The sequence of labels corresponds to translated ASL sentences, comprising a sequence of ASL words. Formally, the probability may be represented as P(z|x), where z is the sequence of labels and x is the probability distribution of each time step. In the present disclosure, the probability distribution of each time step corresponds to the probability of each high level ASL representation, output by the last layer of the B-RNN 714.

In order to form a sequence of labels, the CTC adds an additional label 'blank' (denoted as '_') to the ASL dictionary, meaning no actual labels (words) are emitted (e.g., corresponding to spaces between words in a sentence). As such, for a legitimate sequence of labels, the CTC not only allows repetitions of non-blank labels, but also repetitions of blank labels. For example, recognized paths such as "S_ _L", "SSL" or "SLL_" would all be counted as "SL" in the final translation of an ASL sentence, where "S" and "L" represent labels for two different ASL words. In some embodiments, the blank symbol may be used as the default result when the translation of an ASL sign within an ASL sentence produces undefined or indeterminate results. This process not only eliminates the need for word pre-segmentation and post-processing, but also addresses variable-length sentences. Additionally, adjacent duplicate labels may be deleted and all blank symbols may be removed in the inferred label sequence to derive a translated sequence.

Herein, we define a many-to-one mapping (denoted as $\pi(z)$) wherein the various CTC paths z can be mapped into one sequence of labels. Therefore, to compute the probability of a sequence of labels, softmax layer 718 simply sums over all possible CTC paths, formally written as:

$$p(z|x) = \sum_{path \in \pi(z)} p(path|x)$$

However, as the time step increases, the total number of possible CTC paths increases exponentially and therefore would potentially become computationally intractable. Here, CTC borrows the idea of forward-backward algorithm from Hidden Markov Model (HMM) which computes the probability efficiently. Formally, we have:

$$\alpha_t(s) = \begin{cases} y_{l_s}^t(\alpha_{t-1}(s) + \alpha_{t-1}(s-1)) & \text{if } l_s = \text{blank, or } l_{s-2} \\ y_{l_s}^t(\alpha_{t-1}(s) + \alpha_{t-1}(s-1) + \alpha_{t-1}(s-2)) & \text{otherwise} \end{cases}$$

$$p(z|x) = \sum_{s=1}^{l} \alpha_t(s)\beta_t(s)$$

Where $\alpha_t(s)$ sums the probability of all the CTC paths ending at t with s, $\beta_t(s)$ sums the probability of all the CTC paths starting at t with s, and $y_{l_s}^t$ denotes the probability at t for given label $l_s$. As such, the probability of a sequence labels can be computed as:

$$\beta_t(s) = \begin{cases} y_{l_s}^t(\beta_{t-1}(s) + \beta_{t-1}(s-1)) & \text{if } l_s = \text{blank, or } l_{s-2} \\ y_{l_s}^t(\beta_{t-1}(s) + \beta_{t-1}(s-1) + \beta_{t-1}(s-2)) & \text{otherwise} \end{cases}$$

An example of the probability of sequence label across time computed by CTC is shown in the graph 523 of FIG. 5 corresponding to the translation of the sign language sentence "I want drink".

While the embodiments of sentence-level sign language translation described thus far have been in the context of CTC-based approaches using neural network architectures, it should be noted that other approaches may instead be used to perform sentence-level sign language translation using skeletal-joints data corresponding to a sign language sign or sequence of signs. For example, convolutional neural networks (CNNs) may be used to perform sentence-level sign language translation (e.g., in place of HB-RNN 700), which may utilize encoder-decoder stacking and/or dynamic unfolding. As another example, a neural network architecture that includes two separate RNNs, one for encoding and one for decoding, may be used to perform sentence-level sign language translation (e.g., in place of HB-RNN 700).

The translated word or sentence that is produced as an output of HB-RNN 700 may be reproduced via an output device. For example, the output device may be a speaker that reproduces the translated word or sentence as audible sound. As another example, the output device may be an electronic display on which the translated word or sentence is shown.

The embodiments described herein may applied in a variety of ways. Two examples are now provided, one of a personal interpreter system and the other of an ASL dictionary.

For the first application, a personal interpreter may be implemented using, for example, the system 100 of FIG. 1 and the system architecture 500 of FIG. 5 and the HB-RNN 700 of FIG. 7 (collectively referred to here as ASL translation technology). This personal interpreter may enable real-time two way communications between a deaf person and people who do not understand ASL. The personal interpreter may use the ASL translation technology to translate ASL signs and sentences performed by the deaf person into spoken language(s) for people who do not understand ASL. Additionally, the personal interpreter may use speech recognition technology to translate spoken language into digital text, which may, for example, be projected onto a screen of an augmented reality (AR) headset worn by the deaf person. For instances in which an AR headset is used, translated ASL words and sentences may also be displayed on the AR screen. The AR headset may, for example, be communicatively coupled to the system 100 using a universal serial bus (USB) device or a wireless communications protocol (e.g., Bluetooth, Wi-Fi, etc.).

For the second application, an ASL dictionary may be implemented using, for example, the system 100 of FIG. 1 and the system architecture 500 of FIG. 5 and the HB-RNN 700 of FIG. 7 (collectively referred to here as ASL translation technology). This ASL dictionary may help a deaf person look up ASL words that they do not know the meaning of. Spoken languages (e.g., English) allow one to easily look up an unknown word via indexing. However, this is not the case for ASL. Without the help of a person who understands ASL, there may not conventionally be an available way for a deaf individual to look up the meaning of an ASL sign/word that they do not know or have forgotten the meaning of. The ASL dictionary may solve this problem by taking the sign of an unknown ASL word as input and displaying the meaning of this ASL word in real time, for example, on the screen of an AR headset, as described above in connection with the first application, or on the screen of an electronic tablet device (e.g., that is coupled to system 100 or into which system 100 is integrated).

The present invention has been described in terms of one or more preferred embodiments, and it should be appreciated that many equivalents, alternatives, variations, and modifications, aside from those expressly stated, are possible and within the scope of the invention.

The invention claimed is:

1. A method for translating sign language communications into spoken language communications, comprising:
   receiving, with a processor, a temporal sequence of images corresponding to at least one hand forming a sign language sign;
   determining skeletal joints data of the at least one hand forming the sign language sign based on the temporal sequence of images, wherein the skeletal joints data of the at least one hand forming the sign language sign comprises skeletal joints data of a right hand and a left hand;
   with the processor, extracting spatiotemporal sign language characteristic trajectories based on the skeletal joints data, wherein the spatiotemporal sign language characteristic trajectories comprise right hand shape information, left hand shape information, right hand movement information, and left hand movement information;
   providing spatio-temporal information corresponding to the sequence of images, including, the spatiotemporal sign language characteristic trajectories, to a first bidirectional recurrent neural network (B-RNN) layer of a hierarchical bidirectional recurrent neural network (HB-RNN);
   with the first B-RNN, producing a representation of the spatio-temporal information; and
   producing, via additional layers of the HB-RNN, a translated word of a spoken language that corresponds to the sign language sign based on the representation.

2. The method of claim 1, further comprising applying a Savitzky-Golay filter to the skeletal joints data before providing the spatio-temporal information to the first B-RNN layer.

3. The method of claim 1, wherein the skeletal joints data of the at least one hand forming the sign language sign comprises skeletal joints data of a right hand and a left hand, and
   the method further comprising:
      with the processor, extracting right hand shape information and left hand shape information by normalizing the skeletal joints data to a zero-centered palm-center of the hands by subtracting a skeletal joint index for the palm-center from the skeletal joints data; and
      with the processor, extracting right hand movement information and left hand movement information by calculating spatial displacements of each skeletal joint of the skeletal joints data between two consecutive frames of the frames.

4. The method of claim 1, further comprising:
providing the right hand shape information, the left hand shape information, the right hand movement information, and the left hand movement information to separate RNN units of the first B-RNN layer of the HB-RNN; and
wherein producing the information comprises with the first B-RNN layer, producing a representation of right hand shape, a representation of right hand movement, a representation of left hand shape, and a representation of left hand movement.

5. The method of claim 4, further comprising:
with the first B-RNN layer, providing the representation of right hand shape, the representation of right hand movement, the representation of left hand shape, and the representation of left hand movement to a first fusion layer of the HB-RNN; and
with the first fusion layer, producing a first concatenation matrix by concatenating the representation of right hand shape with the representation of right hand movement; and
with the first fusion layer, producing a second concatenation matrix by concatenating the representation of left hand shape with the representation of left hand movement.

6. The method of claim 5, further comprises:
with the first fusion layer, providing the first concatenation matrix and the second concatenation matrix to a second B-RNN layer of the HB-RNN;
with the second B-RNN layer, producing an integrated representation of right hand characteristics based on the first concatenation matrix; and
with the second B-RNN layer, producing an integrated representation of left hand characteristics based on the second concatenation matrix.

7. The method of claim 6, further comprising:
with the second B-RNN layer, providing the integrated representation of right hand characteristics and the integrated representation of left hand characteristics to a second fusion layer of the HB-RNN; and
with the second fusion layer, producing a third concatenation matrix by concatenating the integrated representation of right hand characteristics with the integrated representation of left hand characteristics.

8. The method of claim 7, further comprising:
with the second fusion layer, providing the third concatenation matrix to a third B-RNN layer of the HB-RNN; and
with the third B-RNN layer, producing a high level sign language representation based on the third concatenation matrix.

9. The method of claim 8, further comprising:
with the third B-RNN layer, providing the high level sign language representation to a fully connected layer of the HB-RNN; and
with the fully connected layer, producing an output matrix based on the high level sign language representation.

10. The method of claim 9, further comprising:
with the fully connected layer, providing the output matrix to a softmax layer of the HB-RNN;

with the softmax layer, producing a cumulative output matrix by summing the output matrices for all frames of the skeletal joints data; and with the softmax layer, determining a word corresponding to the sign language sign by comparing the cumulative output matrix to a trained sign language dictionary.

11. The method of claim 10, further comprising:

with the processor, reproducing the determined word by:

instructing a screen to show the determined word; or instructing a speaker to reproduce the determined word as audible sound.

12. The method of claim 1, further comprising:

receiving, with a processor, a different temporal sequence of images corresponding to at least one hand forming a sign language sign;

determining continuous temporal hand shape and hand movement trajectories from the different sequence of images; and processing the continuous temporal hand shape and hand movement trajectories using the HB-RNN to produce a translated sentence of a spoken language that corresponds to a sign language sentence reflected in the temporal sequence of image and the different temporal sequence of images.

13. A system for translating sign language signs into words of a spoken language, comprising:

at least one processor; and a memory connected to the at least one processor having stored thereon a set of instructions which, when executed by the at least one processor, cause the at least one processor to:

receive a spatiotemporal sequence of skeletal data corresponding to hands communicating a series of signs forming a sentence in a sign language, wherein the spatiotemporal sequence of skeleton data comprises skeletal representations of two hands;

determine right hand shape, left hand shape, right hand movement, and left hand movement for each frame of the spatiotemporal sequence of skeletal data during communication of the series of signs, and use such information as input to a neural network;

process the spatiotemporal sequence of skeletal data using a first bidirectional recurrent neural network (B-RNN) layer of the neural network, wherein the neural network is trained to output a sentence of a spoken language corresponding to the sentence of the sign language, wherein the spoken language and sign language are different languages; and output the sentence of the spoken language to a user.

14. The system of claim 13, wherein the neural network performs sentence-level translation using separate RNN units of the first B-RNN layer of the neural network for each of the right hand shape, left hand shape, right hand movement, and left hand movement.

* * * * *